April 18, 1950     C. E. WARING ET AL     2,504,545
GRANULATED FERTILIZER
Filed Jan. 28, 1947
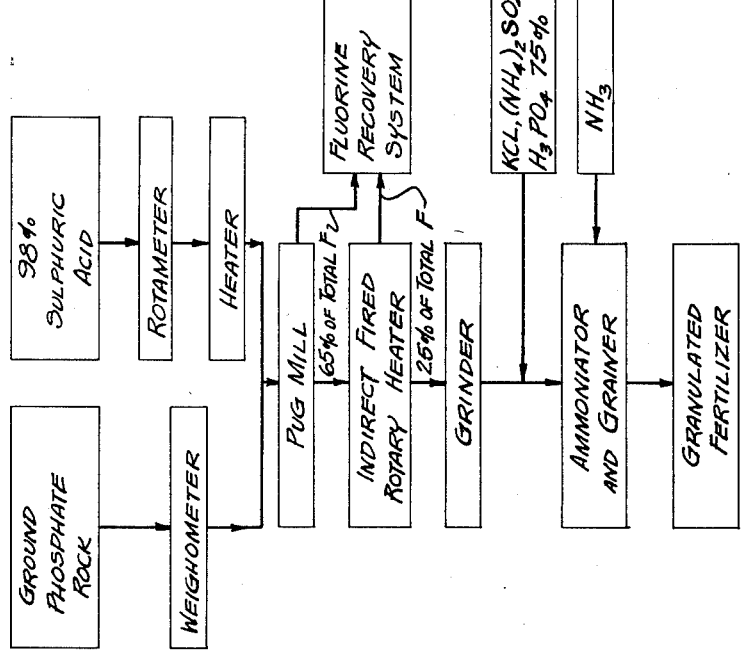
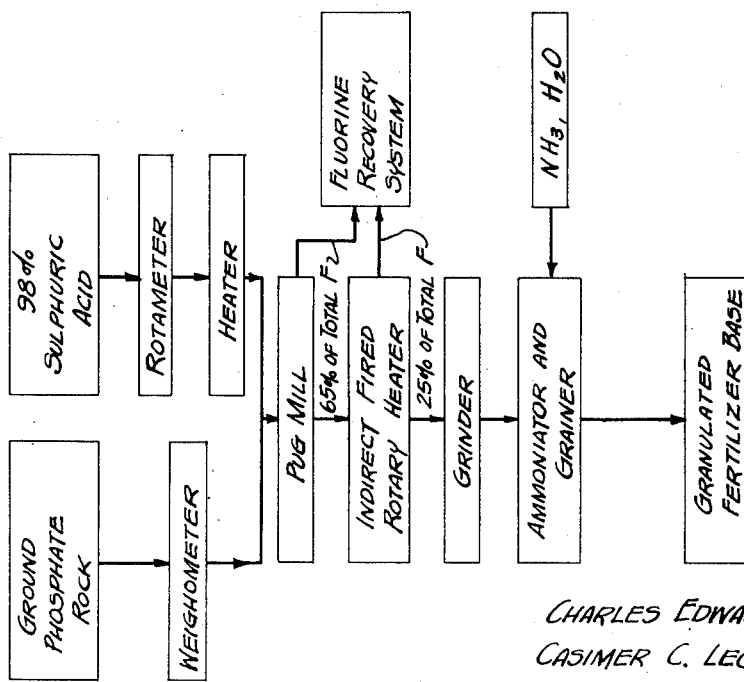
Inventors
CHARLES EDWARD WARING
CASIMER C. LEGAL, JR.
By Semmes, Keegin, Robinson and Semmes
Attorneys Patented Apr. 18, 1950

2,504,545

UNITED STATES PATENT OFFICE 2,504,545

GRANULATED FERTILIZER

Charles Edward Waring, Baltimore, and Casimer C. Legal, Jr., Pasadena, Md., assignors to The Davison Chemical Corporation, Baltimore, Md.

Application January 28, 1947, Serial No. 724,828

4 Claims. (Cl. 71—40)

This invention relates to granulated fertilizer and more particularly has reference to a process of manufacturing granulated fertilizer, which is substantially non-setting and non-bag rotting, directly from the raw materials within a short period of time.

Up to the present time it has been the practice to manufacture granulated complete fertilizer by first making den superphosphate. This den superphosphate after appropriate curing is milled and screened and is then mixed with the other required raw materials as for instance potassium chloride and ammonium sulphate. The resulting mixture is grained in a rotary grainer by the addition of water. The product from the grainer goes to a rotary dryer where the product is dried and hardened. After subsequent screening and dust removing operations, the final product is ready for shipment.

An object of this invention is to provide a granulated mixed fertilizer and a process of preparing the same.

Another object of this invention is to provide a granulated mixed fertilizer having a low fluorine content and a method of preparing the same.

A still further object of this invention is to provide a method of preparing a phosphate fertilizer having a low fluorine content from phosphate rock containing fluorine.

Other objects will appear more fully hereinafter.

In order to facilitate an understanding of the present invention, reference is made to the accompanying drawings in which:

Figure 1 is a flow sheet diagrammatically illustrating the procedures followed in carrying out the present invention; and Figure 2 is another flow sheet showing a modified form of the present invention.

In carrying out the present invention, a dry, finely divided phosphate rock was used which had a composition as follows:

|  | Per cent |
|---|---|
| Moisture | 0.70 |
| Total $P_2O_5$ | 33.00 |
| Total CaO | 45.79 |
| Fluorine | 3.66 |

As diagrammatically illustrated in the accompanying drawings, ground phosphate rock of the above composition is continuously fed through a weighometer into a pug mill. Simultaneously, a supply of sulphuric acid containing about 98% $H_2SO_4$ is continuously passed through a rotameter and through a heater, and thence to the pug mill for admixture with the ground phosphate rock. It will be noted that the phosphate rock which is ground and in finely divided form is dry. In the heater, the 98% sulphuric acid is preferably heated to a temperature ranging between 100° C. and 300° C. although preheating of the acid is not absolutely necessary. When temperatures substantially over 100° C. are used, it is advisable to carry out the heating operation in a closed apparatus.

The phosphate rock and sulphuric acid are introduced in a ratio of about 240 parts by weight of phosphate rock to about 196 parts by weight of the 98% sulphuric acid. As indicated, the rock and acid are mixed, preferably, continuously.

During the mixing operation, approximately 65% of the total fluorine present in the phosphate rock is volatilized. After mixing, the mixture is passed into an indirectly fired rotary heater in which it is heated to a temperature ranging from 200° C. to 300° C. for a period of about 10 to 30 minutes. A direct fired heater may also be used, but when maximum fluorine recovery is desired, the indirect method is preferred. During the heat treatment, approximately 25% additional fluorine is driven off so that altogether about 90% of the fluorine present in the phosphate rock is eliminated in an easily recoverable form. As indicated on the drawings, the fluorine evolved in the pug mill and, also, the fluorine evolved in the rotary heater, are passed to a fluorine recovery system. Maintaining the reaction mixture at 200° C. to 300° C. results in the formation of a clinker which may be leached to form phosphoric acid in the manner described in the co-pending application Serial No. 724,816 of Casimer C. Legal, Thomas O. Tongue and Edward H. Wright, filed on January 28, 1947, and entitled Process of manufacturing phosphoric acid, or treated according to the present invention to produce a granulated fertilizer.

The product from the indirect fired rotary heater is directly passed to a grinder or crusher for breaking up the lumps into which the mixture is formed during the heating operation. The ground material which may be of the order of 10 to 20 mesh is then passed to an ammoniator. It may be preferable to carry out the process of the present invention continuously in which instance a continuous ammoniator may be employed or the invention can be carried out by batches in which instance a batch-type ammoniator may be employed. In any event, the ammoniator is preferably of a rotary type in which the ground material is agitated in a rotary drum which may be provided with lifting baffles and into which liquid or gaseous anhydrous ammonia is introduced.

Sufficient ammonia is added to the heat treated product to produce a mixed fertilizer of the desired composition. For instance, a product designated in the trade as 4-18-0 may be produced. The product upon ammoniation is in a grained condition, being substantially of a 6-60 mesh screen size. Water in the amount of 1.5-3% must be added either during or after ammoniation to furnish the water of crystallization of the product. Otherwise the product will absorb moisture from the air giving a temporarily sticky, lumpy product while the product is absorbing the moisture. Upon satisfying the crystal moisture requirements, either naturally or artificially, a stable product is obtained which is non-setting and non-hygroscopic up to 80% relative humidity.

Enough sulphuric acid should be used in the original mixture to take care of all reactible compounds present in the phosphate rock such as calcium carbonate, tricalcium phosphate and calcium fluoride as well as some of the iron and aluminum oxides and to form phosphoric acid from the tricalcium phosphate present in the rock.

As indicated in Figure 2 of the drawings, the process of the present invention may be modified to produce a mixed fertilizer containing nitrogen, $P_2O_5$, and $K_2O$. As indicated, this process differs from that of Figure 1 in that immediately after grinding of the heat treated product, additional fertilizer constituents, such as potassium chloride, ammonium sulphate and phosphoric acid (75%) are added to the ground product. The mixture of the ground, heat treated material, admixed with the additional products, may then be subjected to ammoniation and simultaneously to a graining action to directly produce a granulated mixed fertilizer.

It should be noted that the product produced by the heat treatment of the acid phosphate rock mixture is a very hygroscopic material. If it is handled immediately, no difficulty in handling is encountered, but if there is a delay in handling, the material absorbs water to a great extent and becomes quite a sticky mass. Obviously, the heat treated product could not be directly used as a commercial fertilizer whereas the ammoniated product is exceedingly satisfactory in that it can be handled and bagged without danger of the mixture setting to form a hard mass. In accordance with the present invention, a fertilizer may be produced or the product may be varied within a wide range to include other fertilizing constituents, such as $K_2O$. In this instance, the composition of the final product may be 8-12-8, 4-18-8, etc.

Subsequent to the graining operation, the grained product may be subjected to double screening to obtain a granular fertilizer of desired size. The fines and oversize may be handled in the usual manner by returning them to various points in the process.

The product obtained is a non-setting composition and the process of manufacture is a continuous operation requiring relatively small apparatus and a minimum number of operating personnel, which means that both first cost and operating cost are low. The time of manufacture from the time the phosphate rock and acid are mixed until the final product is produced is only about 1½ hours. This is a considerable saving over the prior art processes in which several weeks are required for production of the granular fertilizer.

We claim:

1. A method of manufacturing a mixed phosphatic fertilizer having a low fluorine content and in a condition suitable for bagging and use, comprising mixing finely divided phosphate rock with sulfuric acid having a concentration of at least 93% $H_2SO_4$, said phosphate rock and sulfuric acid being mixed in such proportions that at least sufficient sulfuric acid is present to react with the acid reactible constituents in the rock and form phosphoric acid from the calcium phosphate present therein, heating the reaction mixture to a temperature of about 200° C. to 300° C. to form a clinker, grinding the clinker formed in the heating step, and ammoniating and adding water to the ground clinker to form a mixed fertilizer in a condition for packing without curing.

2. A method of manufacturing a mixed phosphate fertilizer having a low fluorine content and in a condition suitable for bagging and use comprising mixing finely divided phosphate rock with sulfuric acid having a concentration of at least 93% $H_2SO_4$, said phosphate rock and sulfuric acid being mixed in such proportions that at least sufficient sulphuric acid is present to react with the acid reactible constituents in the rock and form phosphoric acid from the calcium phosphate present therein, heating the reaction mixture to a temperature of about 200° C. to 300° C. to form a clinker, grinding the clinker formed in the heating step, adding other fertilizer constituents to the clinker, and ammoniating and adding water to the ground clinker to form a mixed fertilizer in a condition for packing without curing.

3. A method of manufacturing a mixed phosphate fertilizer having a low fluorine content and having a physical condition suitable for immediate use without curing comprising heating 93% to 98% sulfuric acid to a temperature of 100° C. to 300° C., mixing the heated sulfuric acid with finely divided phosphate rock, at least sufficient sulfuric acid being added to the phosphate rock to react with all of the acid reactible constituents therein and with the calcium orthophosphate in the phosphate rock to form phosphoric acid, heating the mixture to a temperature of 200° C. to 300° C. for about 10 to 30 minutes whereby a clinker of the reaction products is formed, grinding the clinker formed in the heating step, and immediately ammoniating and adding water to the ground clinker to form a product ready for use.

4. A method of making a mixed fertilizer having a low fluorine content comprising reacting phosphate rock with 98% sulfuric acid at a temperature ranging from 100° C. to 300° C., said sulfuric acid being present in a range from that sufficient to a quantity slightly in excess of that necessary to react with the acid reactible constituents in the phosphate rock and form phosphoric acid from the calcium phosphate in the phosphate rock, maintaining the reaction mixture at a temperature of about 200° C. to 300° C. to form a clinker of reaction product, grinding the resulting clinker, adding anhydrous ammonia to the ground clinker, and adding water to the ground clinker to form a conditioned mixed fertilizer.

CHARLES EDWARD WARING.
CASIMER C. LEGAL, Jr.

(References on following page)

REFERENCES CITED

The following references are of record in the file of this patent:

UNITED STATES PATENTS

| Number | Name | Date |
|---|---|---|
| 1,637,428 | Rupp | Aug. 2, 1928 |
| 1,712,404 | Rupp | May 7, 1929 |
| 1,849,987 | Moore | Mar. 15, 1932 |
| 1,851,179 | Hechenbleikner | Mar. 29, 1932 |
| 1,916,114 | Ober | June 27, 1933 |
| 2,060,310 | Harvey | Nov. 10, 1936 |
| 2,173,826 | Curtis | Sept. 26, 1939 |
| 2,338,407 | Coleman | Jan. 4, 1944 |

FOREIGN PATENTS

| Number | Country | Date |
|---|---|---|
| 5,520 | Great Britain | A. D. 1885 |
| 300,965 | Great Britain | Feb. 17, 1930 |

OTHER REFERENCES

Fox et al., Ind. and Engr. Chem., vol. 38, No. 3, 1946, pages 329–334.